US008358696B2

(12) United States Patent
Bukin

(10) Patent No.: US 8,358,696 B2
(45) Date of Patent: Jan. 22, 2013

(54) MOTION ESTIMATION TECHNIQUES

(75) Inventor: Dov Bukin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 877 days.

(21) Appl. No.: 12/346,979

(22) Filed: Dec. 31, 2008

(65) Prior Publication Data

US 2010/0166072 A1 Jul. 1, 2010

(51) Int. Cl.
*H04B 1/66* (2006.01)
*H04N 7/12* (2006.01)
*H04N 11/02* (2006.01)
*H04N 11/04* (2006.01)

(52) U.S. Cl. .................................. 375/240.16
(58) Field of Classification Search ............. 375/240.16
See application file for complete search history.

(56) References Cited

U.S. PATENT DOCUMENTS

| | | | | |
|---|---|---|---|---|
| 5,247,355 A * | 9/1993 | Frederiksen | ............ | 375/240.12 |
| 5,761,398 A | 6/1998 | Legall | | |
| 6,438,254 B1 * | 8/2002 | Kadono et al. | ............... | 382/107 |
| 6,842,483 B1 * | 1/2005 | Au et al. | ................... | 375/240.16 |
| 6,885,705 B2 * | 4/2005 | Arita et al. | ............... | 375/240.16 |
| 7,227,896 B2 * | 6/2007 | Sun | ........................... | 375/240.16 |
| 7,424,058 B1 * | 9/2008 | Staley et al. | ............. | 375/240.23 |
| 2005/0013364 A1 | 1/2005 | Hsu et al. | | |
| 2007/0242752 A1 | 10/2007 | Kuzuya | | |

FOREIGN PATENT DOCUMENTS

| | | |
|---|---|---|
| WO | 2010/078146 A2 | 7/2010 |
| WO | 2010/078146 A3 | 9/2010 |

OTHER PUBLICATIONS

International Preliminary Report on Patentability received for PCT Patent Application No. PCT/US2009/069159, mailed on Jul. 14, 2011, 4 pages.
International Search Report and Written Opinion received for PCT Patent Application No. PCT/US2009/069159, mailed on Jul. 30, 2010, 8 pages.
Huang et al., "Global elimination algorithm and architecture design for fast block matching motion estimation", IEEE Transactions on Circuits and Systems for Video Technology, IEEE Circuits and Systems Society, Digital Object Identifier 10.1109/TCSVT.2004. 828321, vol. 14, Issue 6, Jun. 2004, pp. 898-907.
Oh et al., "A fast full search motion estimation algorithm using the sum of partial norms", International Conference on Consumer Electronics, 2000. ICCE. 2000 Digest of Technical Papers, Jun. 2000, Digital Object Identifier 10.1109/ICCE.2000.854602, pp. 236-237.

* cited by examiner

*Primary Examiner* — Christian LaForgia
*Assistant Examiner* — James Turchen
(74) *Attorney, Agent, or Firm* — Blakely, Sokoloff, Taylor & Zafman LLP

(57) ABSTRACT

Techniques for motion estimation are disclosed. For example, embodiments may determine error metric lower bound values for a block in a current image, where each of the error metric lower bound values corresponds to a search position in a reference image. Based on a separation threshold, a plurality of candidate positions may be identified from the search positions. A matching position is then identified from the candidate positions. Based on the matching position, a motion vector is determined.

20 Claims, 6 Drawing Sheets

MOTION ESTIMATION TECHNIQUES

BACKGROUND

It is becoming increasingly common for devices to have video and image processing capabilities. For instance, many portable and fixed devices are now able to capture, display, encode, and/or compress images for video applications. These capabilities often impose significant loads on a device's resources, such as its processing and memory assets.

As a result, operations such as video encoding may cause an inability of the device to perform additional tasks, and/or a reduction in the device's battery life. Accordingly, techniques are needed to improve the efficiency of such operations.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques for motion estimation. For example, embodiments may determine error metric lower bound values for a block in a current image, where each of the error metric lower bound values corresponds to a search position in a reference image. Based on a separation threshold, a plurality of candidate positions may be identified from the search positions. A matching position is then identified from the candidate positions. Based on the matching position, a motion vector is determined.

Through the employment of such techniques, improvements in computational efficiency may be advantageously achieved.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
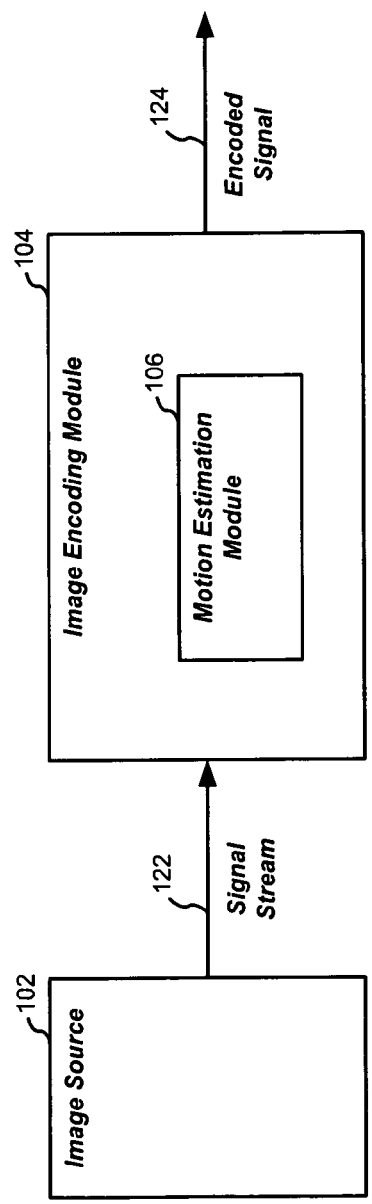
FIG. 1 is a diagram of an exemplary apparatus.

FIG. 1 is a diagram of an exemplary apparatus 100 in which the techniques disclosed herein may be employed. This apparatus may include various elements. For instance, FIG. 1 shows apparatus 100 including an image source 102 and an image encoding module 104. These elements may be implemented in hardware, software, or any combination thereof.

Image source 102 provides pixel values to image encoding module 104. More particularly, FIG. 1 shows that these pixel values may be arranged into a signal stream 122, which represents one or more images. Thus, signal stream 122 may comprise a sequence of frames or fields having multiple pixel values. Each frame/field (also referred to as an image) may correspond to a particular time or time interval. In embodiments, signal stream 122 is digital. Alternatively, signal stream 122 may be analog.

In embodiments, image source 102 may comprise a storage medium (e.g., memory) that stores, for example, video content and/or images. Alternatively, images source 104 may comprise a communications medium that provides image encoding module 104 with signal stream 122. Such a communications medium may be wired or wireless.

As a further alternative, image source 102 may comprise an arrangement of elements that capture images and generate corresponding signals. For example, in embodiments, image source 102 may include an optics assembly and an image sensor.

Such an optics assembly may include one or more optical devices (e.g., lenses, mirrors, etc.) to project an image within a field of view onto multiple sensor elements within the image sensor. Moreover, the optics assembly may include mechanism(s) to control the arrangement of its optical device(s). For example, such mechanisms may control focusing operations, aperture settings, zooming operations, shutter speed, effective focal length, etc. Embodiments, however, are not limited to these examples.

Such an image sensor may include an array of sensor elements (e.g., complementary metal oxide semiconductor (CMOS) sensors, charge coupled devices (CCDs), etc.). These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. In turn, the image sensor may convey such values in signal stream 122.

Image encoding module 104 encodes (e.g., compresses) image signals conveyed in signal stream 122 to produce an encoded signal 124. Such encoding may be in accordance with one or more techniques. For instance image encoding module 104 may employ various compression techniques to take advantage of redundancies (e.g., spatial redundancies and/or temporal redundancies) inherent in signal stream 122. Such techniques may include block matching algorithms.

Block matching algorithms (BMAs) involve determining a motion vector (also referred to herein as a displacement vector). The motion vector estimates the horizontal and vertical displacement of a block from a reference image to a current image. The determination of such motion vectors is also referred to as motion estimation. Accordingly, FIG. 1 shows image encoding module 104 includes a motion estimation module 106.

Motion estimation module 106 determines motion vectors for blocks (e.g., macroblocks) within images or frames. In turn, image encoding module 104 may include these motion vectors in encoded signal 124.

In embodiments, image encoding module 104 may comply, for example, with one or more Moving Pictures Expert Group (MPEG) standards, such as MPEG-2 and/or MPEG-4. Also, image encoding module 104 may comply with one or more standards established by the International Telecommunications Union (ITU) Telecommunication Standardization Sector (ITU-T). Examples of such standards include H.261, H.263, and H.264. Embodiments, however, are not limited to these examples.

As described above, image encoding module 104 generates encoded signal 124 from signal stream 122. In turn, apparatus 100 may store encoded signal 122 in a storage medium (e.g., memory). Apparatus 100 may also decode and output (e.g., display) encoded signal 124. Further, apparatus 100 may send encoded signal 124 to a remote device via one or more networks (not shown). Upon receipt, the remote device may store, decode, and/or output (e.g., display) the corresponding images.

Apparatus 100 may be implemented in various devices, such as a handheld apparatus or an embedded system. Examples of such devices include mobile wireless phones, Voice Over IP (VoIP) phones, personal computers (PCs), personal digital assistants (PDAs), and digital cameras. In addition, this system may also be implemented in land line based video phones employing standard public switched telephone network (PSTN) phone lines, integrated digital services network (ISDN) phone lines, and/or packet networks (e.g., local area networks (LANs), the Internet, etc.). Embodiments, however, are not limited to these examples.

Operations for various embodiments may be further described with reference to the following figures and accompanying examples. Some of the figures may include a logic flow. Although such figures presented herein may include a particular logic flow, it can be appreciated that the logic flow merely provides an example of how the general functionality described herein may be implemented. Further, the given logic flow does not necessarily have to be executed in the order presented unless otherwise indicated. In addition, the given logic flow may be implemented by a hardware element, a software element executed by a processor, or any combination thereof. Embodiments are not limited to this context.

As described above, embodiments may generate encoded image signals from unencoded pixel data. For example, image encoding module 104 of FIG. 1 may employ encoding techniques that utilize temporal redundancies between successive images. Thus, aspects of a current image may be represented with reference to a previous reference image.

For example, such encoding techniques may determine motion vectors associated with blocks (e.g., macroblocks) in a current image or frame. More particularly, each motion vector represents a displacement made by the corresponding block between the previous reference image and the current image.

The Sum-of-Absolute-Differences (SAD) has gained wide spread adoption as a basis (or metric) for determining motion vectors. This is due to its simplicity and straightforward implementation. The SAD may be calculated as expressed below in Equation (1).

$$SAD(m, n) = \sum_{i=0}^{N-1} \sum_{j=0}^{N-1} |\text{current}(i, j) - \text{reference}(i+m, j+n)| \quad (1)$$

In Equation (1): m and n represent a displacement between the current block and a previous reference block-in the x and y directions, respectively; current(i,j) represents a value of the current image at position i,j; and reference(i+m, j+n) represents a value of a previous image at position i+m, j+n.

Accordingly, the SAD of Equation (1) provides a set of values for a particular block. In particular, Equation (1) shows that the SAD is a function of a displacement vector (the displacement vector having components m and n).

An algorithm called the full search block matching algorithm (FSBMA) provides a simple way for performing the motion estimation. This algorithm involves calculating an SAD for each m and n within a search area (also referred to as a search window) and selecting m and n values that yield the minimal SAD as the "best" motion vector. Unfortunately, the FSBMA is computationally demanding.

However, other techniques exist that are less demanding. For example, FAST motion estimation algorithms (e.g., diamond search, tree step search, and four step search) increase computational efficiency by considering only some of the points inside a reference frame search area. Nevertheless, such fast search algorithms exhibit a drawback called the "local minimum problem". This problem can prevent the "best minimum" motion vectors from being attained.

An algorithm called the successive elimination algorithm overcomes the local minimum problem. Also, this algorithm is convenient to implement in software. The successive elimination algorithm, which is less computationally demanding than the FSBMA, finds the best minimum motion vectors with a "minimal error". The successive elimination algorithm is based on the mathematical inequality provided below in Expression (2).

$$SAD(m, n) = \sum_{i=0}^{N-1} \sum_{j=0}^{N-1} |\text{current}(i, j) - \text{reference}(i+m, j+n)| \geq \quad (2)$$

$$\left| \sum_{i=0}^{N-1} \sum_{j=0}^{N-1} \text{current}(i, j) - \sum_{i=0}^{N-1} \sum_{j=0}^{N-1} \text{reference}(i+m, j+n) \right| = SSAD(m, n)$$

As shown in Expression (2), SSAD(m,n) (subsampled SAD function) provides a lower bound for SAD(m,n). Also, for a given point, SSAD(m,n) requires fewer calculations than SAD(m,n). Thus, the successive elimination algorithm first calculates SSAD(m,n) for a given point, If the calculated SSAD(m,n) value does not reveal a desirable lower bound for the corresponding SAD(m,n) value (i.e., if the calculated SSAD(m,n) value is not lower than a currently known minimum SAD value), then the more expensive calculation of SAD(m,n) for this point is skipped.

An algorithm called the global elimination algorithm is similar to the successive elimination algorithm because it also employs SSAD(m,n) as a lower bound for SAD(m,n). For instance, the global elimination algorithm calculates SSAD (m,n) for a number of search positions (designated by the integer P) and sorts them in the manner shown below in Expression (3).

$$\{SSAD_0 \leq SSAD_1 \leq SSAD_2 \leq$$
$$SSAD_{M-1} \leq SSAD_M \leq SSAD_{P-1} \leq SSAD_P\} \quad (3)$$

Then, the global elimination algorithm finds the best M<<P search positions with the minimal SSAD values. These search positions are indicated as $(m_i, n_i)$ in Expression (4), below.

$$(m_i, n_i) = \{(m,n) | SSAD(m,n) \leq SSAD_M\} \quad (4)$$

After these M search positions are identified, the global elimination algorithm calculates SAD(m,n) for each of the M search positions. Then, the position with the minimal SAD among the M candidates is identified. This position reveals the motion vector MV, in accordance with Expression (5), below.

$$MV = \{(u,v) | SAD(u,v) \leq SAD(m_i, n_i), \forall i < M\} \quad (5)$$

A major disadvantage of the global elimination algorithm is that it needs to sort SSAD(m,n) values of all P search points inside the search area. Thus, this algorithm can be computationally expensive.

Embodiments employ an algorithm that is referred to herein as the two-layer integer algorithm. Like the global elimination algorithm, the two-layer integer algorithm utilizes the correlation between SSAD and SAD values. However, unlike the global elimination algorithm, the two-layer integer algorithm does not need to sort SSAD values for all P points. As a result, gains in computational efficiency may be attained.

The two-layer integer algorithm identifies a threshold value T that divides the SSAD values into a first set and a second set. The first set includes all SSAD(m,n) values that are less than or equal to T. In contrast, the second set includes all SSAD(m,n) values that are greater than T.

The threshold value T may be identified such that it yields a number of elements in the first set that is close to a desired value, M. Thus, in embodiments, T depends on the selected value of M.

The two-layer integer algorithm provides a high probability of success in finding the "best" motion vector. Expression (6), below, shows criteria for points within the first set ($m_i$, $n_i$). Also, Expression (7) shows that the number of points within the first set may vary from M by an amount, $\Delta$.

$$(m_i, n_i) = \{(m, n) | SSAD(m, n) \leq T\} \qquad (6)$$

$$|(m_i, n_i)| = M \pm \Delta \qquad (7)$$

One technique for finding T involves employing a limited search range. Expression (8) shows that this limited search range has a lower limit $T_{min}$ and an upper limit $T_{max}$.

$$T \in [T_{min}, T_{max}] \qquad (8)$$

In embodiments, $T_{min}$ may be selected as the minimum of all SSAD values, while $T_{max}$ may be selected to be average of all the SSAD values. These selections are expressed below in Equations (9) and (10).

$$T_{min} = \{SSAD(u, v) | SSAD(u, v) \leq SSAD(m_i, n_i), \forall\ i \leq P\} \qquad (9)$$

$$T_{max} = \frac{1}{P}\sum_{i=0}^{P} SSAD(m_i, n_i) \qquad (10)$$

Such selection of $T_{max}$ may be based, for example, on Markov's inequality, provided in Expression (11).

$$P(|x| \geq a) \leq \frac{E(|x|)}{a}, a > 0 \qquad (11)$$

For example, M may be selected such that it is 10% of the total P points. By modeling the set of all P SSAD values as a positive random variable X having a discrete uniform distribution, application of Markov's inequality (substituting T for a) provides the analysis of Expressions (12) and (13). This analysis shows that the average SSAD value of all P points provides a suitable upper bound for T (i.e., $T_{max}$).

$$P(|x| \geq T) = 0.9 \qquad (12)$$

$$0.9 \leq \frac{E(|x|)}{T} \rightarrow T \leq \frac{E(|x|)}{0.9} \qquad (13)$$

In embodiments, once $T_{min}$ and $T_{max}$ are identified, the best T threshold value may be determined. This determination may involve employing a binary search algorithm.

In embodiments, SAD and SSAD values may be based on individual pixel values. However, in further embodiments, SAD and SSAD values may be based on sums corresponding to pixel blocks. An example of this technique is provided in FIG. 2.

Figure 2:
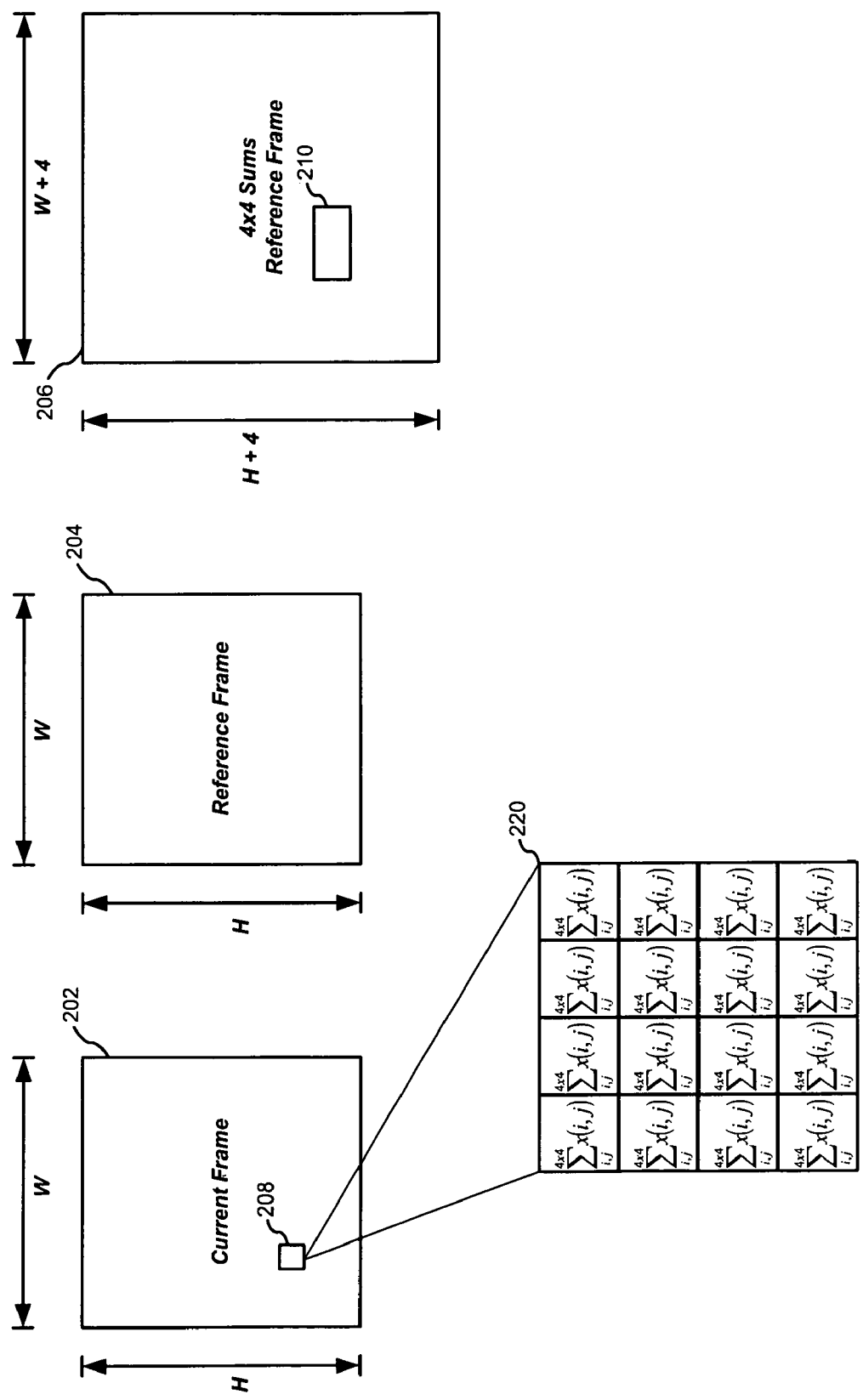
FIG. 2 is a diagram of exemplary frames.

In particular, FIG. 2 is a diagram showing a current frame 202, a reference frame 204, and a processed reference frame 206. Current frame 202 includes a macroblock 208. This macroblock represents an area within current frame 202 that is 16 pixels wide by 16 pixels tall (16×16).

For purposes of SAD and SSAD calculations, pixel values within macroblocks may be combined to increase computational efficiency. For example, multiple 4×4 subblocks exist within macroblock 208. Each subblock's pixel values are summed to generate a corresponding value for macroblock 208. Thus, macroblock 208 may be represented as a 4×4 array of values (i.e., a value for each subblock).

This principle is shown in FIG. 2 by an enlarged representation 220 of macroblock 206. In this representation, macroblock 208 is shown as a 4×4 array of sums. Each of these sums (provided below in Expression 14) is a pixel value total for the corresponding 4×4 subblock:

$$\sum_{i,j}^{4 \times 4} x(i, j) \qquad (14)$$

Thus, based on technique, SSAD values the macroblock 208, may be calculated, as shown below in Expression (15)

$$SSAD(m, n) = \qquad (15)$$

$$\sum_{j=1}^{4}\sum_{i=1}^{4} ||| current_{i,j}^{4 \times 4}|| - ||reference(m, n)_{i,j}^{4 \times 4}||| \leq SAD^{16 \times 16}(m, n);$$

$$\text{where: } ||X_{i,j}^{4 \times 4}|| = \sum_{i,j}^{4 \times 4} x(i, j)$$

Embodiments may further improve computational efficiency by calculating subblock pixel values for an entire reference frame. These calculations extend beyond the reference frame's size by the size of the employed subblock. For instance, FIG. 2 shows an enlarged reference frame 206 having a height H+4 and a width W+4. Within this enlarged reference frame is a search window 210 to within which a motion vector may be sought.

Figure 3:
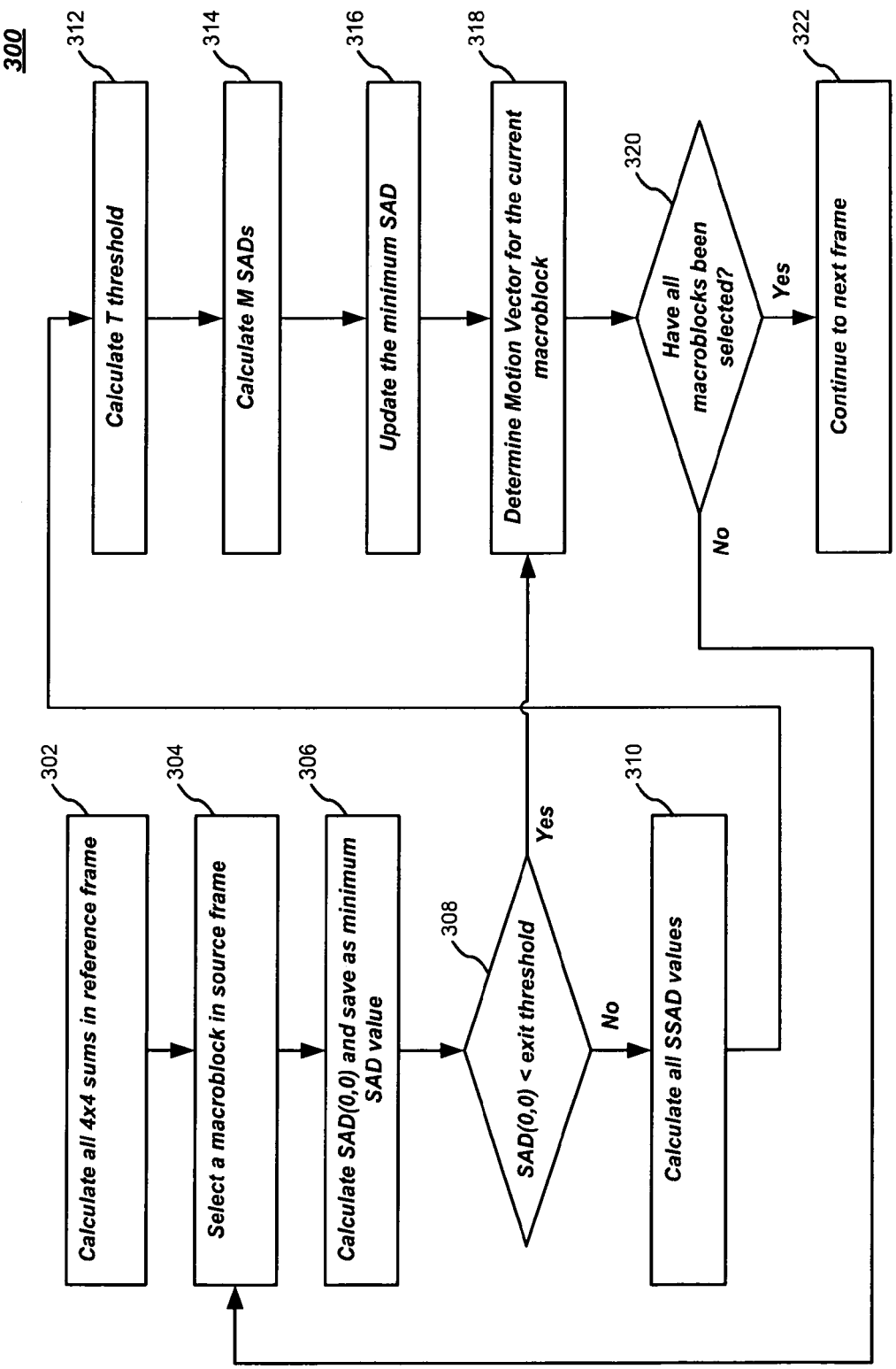
FIG. 3 is a flow diagram showing exemplary operations.

FIG. 3 illustrates an embodiment of a logic flow. In particular, FIG. 3 illustrates a logic flow 300, which may be representative of the operations executed by one or more embodiments described herein. Although FIG. 3 shows a particular sequence, other sequences may be employed. Also, the depicted operations may be performed in various parallel and/or sequential combinations.

The flow of FIG. 3 involves the estimation of motion vectors for macroblocks within a current image (frame). These motion vectors are based on a reference image (frame). FIG. 3 shows that, at a block 302, all subblock (e.g., 4×4 subblock) sums are calculated for the reference image.

At a block 304, a macroblock within the current image is selected. Based on this selection, a zero displacement SAD value is determined at a block 306. This SAD value is designated as a minimum SAD value. As indicated by a block 308, operation proceeds to a block 316 if this SAD value is less than a predetermined exit threshold. Otherwise, operation proceeds to a block 310.

Multiple SSAD values are calculated at block 310. This may comprise, for example, calculating all SSAD values within an employed search window.

At a block 312, a separation threshold is determined. This may comprise determining a threshold T, as described above with reference to Expressions (6) through (13).

Based on the determined separation threshold, M search positions are identified. Accordingly, at a block 314, SAD values are calculated for each of these search positions. Based on these SAD values (and the zero displacement SAD value determined at block 306), the minimum SAD value is updated at a block 316.

Accordingly, at a block 318, a motion vector is determined for the selected macroblock. This motion vector corresponds to the minimum SAD value.

At a block 320, it is determined whether all the macroblocks within the current image have been selected. If not, then operation returns to block 304 for the selection of a further macroblock. Otherwise, operation proceeds to a block 322. At block 322, a next image (e.g., frame) is selected as the current frame. In turn, operations, such as those described herein may be performed again.

Figure 4:
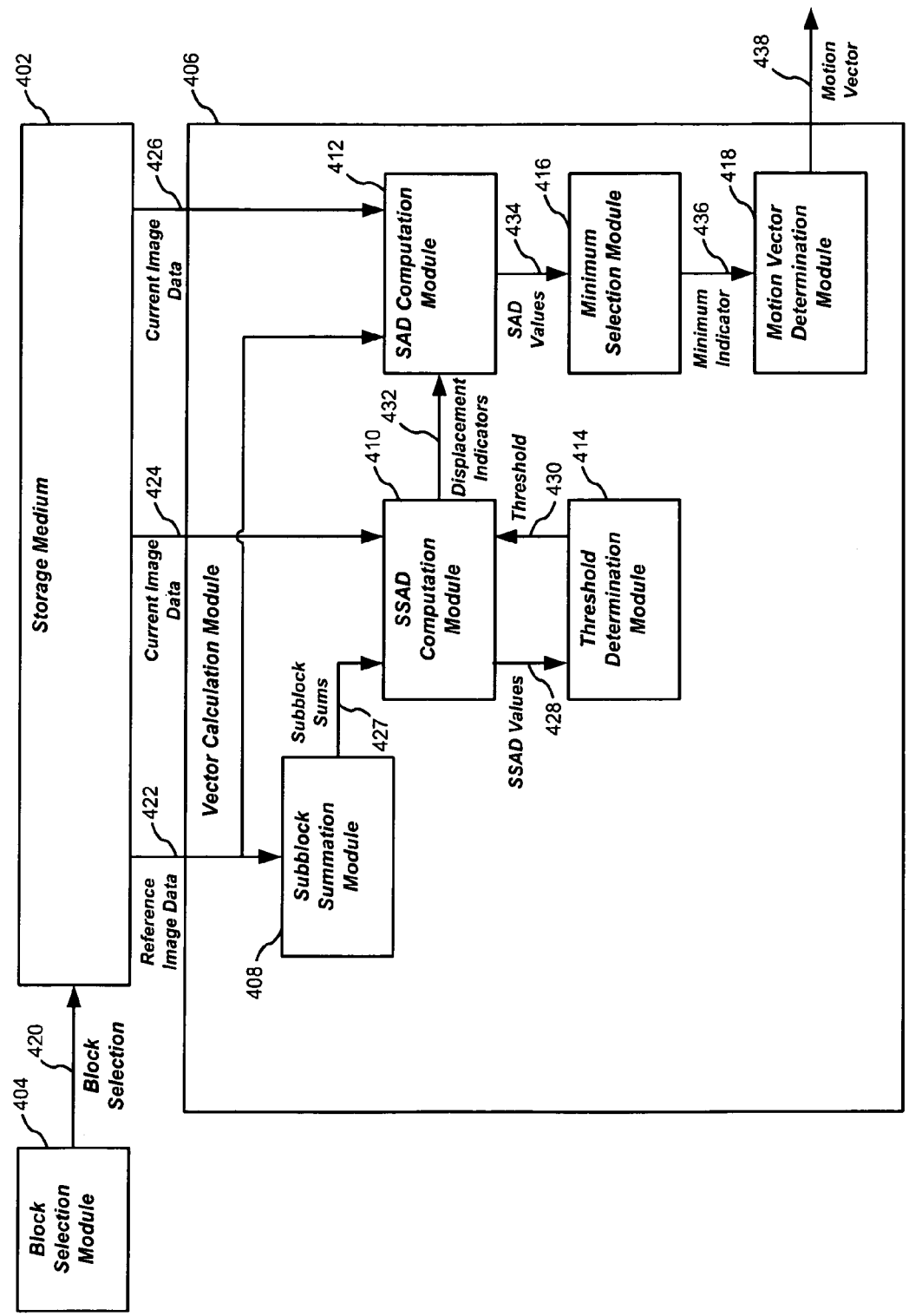
FIG. 4 is a diagram of an exemplary implementation.

FIG. 4 is a diagram of an exemplary implementation 400. This implementation may perform motion estimation techniques, such as the techniques of FIG. 3. Accordingly, implementation 400 may be included in image encoding module 104 of FIG. 1.

Implementation 400 may include various elements. For instance, FIG. 4 shows implementation including a storage medium 402, a block selection module 404, and a vector calculation module 406. These elements may be implemented in hardware, software, or any combination thereof.

Storage medium 402 may store data for multiple images or frames. For example, storage medium 402 stores pixel data for a current frame and pixel data for a reference frame. Storage medium 402 may include, for example, memory and/or other types of tangible storage devices. Examples of memory and such storage devices are provided below.

Block selection module 404 selects a block (e.g., a macroblock) within the current image. As indicated in FIG. 4, this selection results a selection indicator 420 being sent to storage medium 402. Based on this selection indicator, storage medium 402 provides data to vector calculation module 406. In particular, FIG. 4 shows storage medium 402 providing reference image data 422, current image data 424, and current image data 426.

Vector calculation module 406 calculates a motion vector 438 for the block selected by block selection module 402. This calculation may be in accordance with the techniques described herein. As shown in FIG. 4, vector calculation module 404 includes a subblock summation module 408, an SSAD computation module 410, an SAD computation module 412, a threshold determination module 414, a minimum selection module 416, and a motion vector determination module 418. As described above, these elements may be implemented in hardware, software, or any combination thereof.

FIG. 4 shows that subblock summation module 408 receives reference image data 422 from storage medium 402. Based on this data, subblock summation module 408 calculates subblock sums 427, which are sent to SSAD computation module 410 and SAD computation module 412.

SSAD computation module 410 receives subblock sums 427 and current image data 424. From this information, SSAD computation module 410 calculates SSAD values 428, as described herein. Such SSAD values may correspond to displacements within a search window. As shown in FIG. 4, SSAD computation module 410 sending SSAD values 428 to threshold determination module 414.

Upon receipt of this information, threshold determination module 414 determines a separation threshold for the SSAD values. For instance, threshold determination module 414 may determine T, as described above with reference to Expressions (6) through (13). Based on this determination, threshold determination module 414 returns a threshold 430 to SSAD computation module 410.

In response to this threshold, SSAD computation module 410 sends displacement indicators 432 to SAD computation module 430. These indicators correspond to SSAD values that comply with threshold 430. Thus, SSAD computation module 410 may send M±Δ indicators to SAD computation module 412.

FIG. 4 shows that SAD computation module 412 receives reference image data 422 and current image data 426. Based on this information, SAD computation module 412 calculates SAD values for each of displacement indicators 432. Additionally, as described above with reference to FIG. 3, SAD computation module 412 may calculate a zero displacement SAD value. The results of these calculations are sent to minimum selection module 416 as SAD values 434.

Minimum selection module 416 sorts SAD values 434 and identifies a minimum SAD value. From this, minimum selection module 416 generates an indicator 436 of the displacement corresponding to the minimum SAD value. As shown in FIG. 4, this indicator is sent to motion vector determination module 418. Based on indicator 436, motion vector determination module 418 determines motion vector 438.

Figure 5:
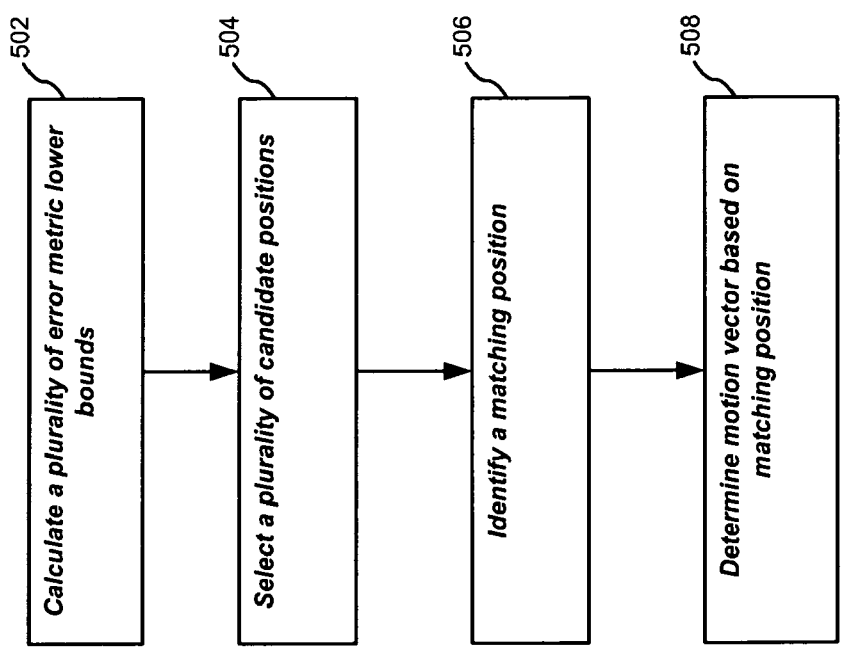
FIG. 5 is a flow diagram showing exemplary operations.

The foregoing description provides techniques for performing motion estimation. FIG. 5 is a further flow diagram showing features of such techniques. In particular, FIG. 5 illustrates a logic flow 500, which may be representative of the operations executed by one or more embodiments described herein. Although FIG. 5 shows a particular sequence, other sequences may be employed. Also, the depicted operations may be performed in various parallel and/or sequential combinations.

At a block 502, a plurality of error metric lower bound values (e.g., SSAD values) are calculated for a block in a current image. Each of these error metric lower bound values corresponds to a search position in a reference image.

At a block 504, a plurality of candidate positions are selected from the plurality of search positions. This selection may be based on a separation threshold, such as T, which is described above in connection with Expressions (6) through (13). Accordingly, embodiments may determine the separation threshold based on error metric lower bound values calculated at block 502. Also, these candidate positions may include a zero displacement position (e.g., as described with reference to block 306 of FIG. 3).

From these candidate positions, a matching position is identified at a block 506. This identification may involve determining error metric values (e.g., SAD values) for each of the candidate positions, and identifying the lowest error metric value.

At a block 508, a motion vector based on the block in the current image and the matching block is determined.

These operations may be performed for multiple blocks in the current image. Moreover an encoded image may be generated that includes motion vectors (as generated above) for one or more blocks.

As described above, techniques described herein may be employed in the context of image/video encoding. For instance, FIG. 1 shows an image encoding module 104.

Figure 6:
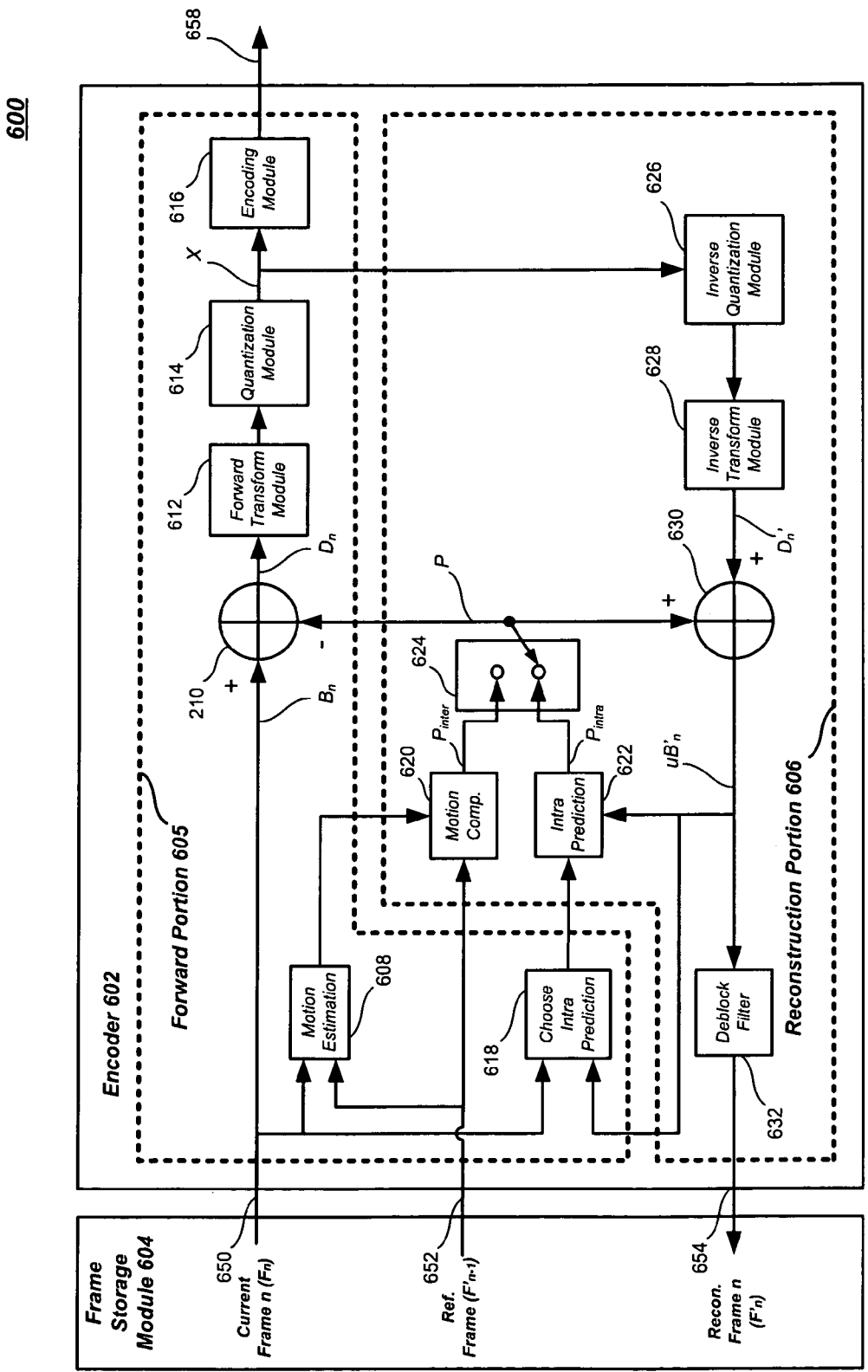
FIG. 6 is a diagram of an exemplary implementation that may be included within an image encoding module.

FIG. 6 shows an exemplary implementation 600 that may be included within image encoding module 104. This implementation may include various elements, such as an encoder 602, a frame storage module 604, and a parameter setting module 607. However, the embodiments are not limited to these elements.

Encoder 602 may employ a hybrid transform-based motion compensated encoding scheme. The embodiments, however, are not limited to this example. Such encoding schemes may exploit spatial and temporal redundancies to reduce the amount of data needed to represent images. Thus, encoder 602 may comply, for example, with one or more Moving Pictures Expert Group (MPEG) standards, such as MPEG-2 and MPEG-4. Also, encoder 602 may comply with one or more standards established by the International Telecommunications Union (ITU) Telecommunication Standardization Sector (ITU-T). Examples of such standards include H.261, H.263, and H.264.

FIG. 6 shows that encoder 602 includes a forward portion 605 and a reconstruction portion 606. Forward portion 605 receives uncompressed image information and outputs this information in encoded (e.g., compressed) form. However, forward portion 605 relies on reconstruction portion 606 to provide predictive information that is employed for encoding.

Frame storage module 604 stores image signals, such as frames. These frames may be received, for example, from an image sensor, such as image sensor 104. Further, with reference to FIG. 4, frame storage module 204 may provide the features of storage medium 402. Additionally, frame storage module 604 stores reconstructed frames received from encoder 602. Accordingly, frame storage module 604 may include a storage medium, such as memory. Examples of storage media are provided below.

Referring again to encoder 602, FIG. 6 shows that its forward portion 605 may include motion estimation module 106 of FIG. 1. In addition, forward portion 205 may include a combining (e.g., difference) node 610, a forward transform module 612, a quantization module 614, an encoding module 616, and a choose intra prediction module 618. Also, FIG. 6 shows that reconstruction portion 606 may include a motion compensation module 620, an intra prediction module 622, a routing module 624, an inverse quantization module 626, an inverse transform module 628, a combining (e.g., summation) node 630, and an in-loop deblocking filter 632.

FIG. 6 shows that frame storage module 604 presents a current frame 650 (also shown as $F_n$) to forward portion 605. In addition, frame storage module 604 presents forward portion 605 with a reference frame 652 (also shown in FIG. 6 as $F'_{n-1}$). However, more than one reference frame may alternatively be presented. Encoder 602 processes these frames in units of macroblocks, such as areas of 16×16 images pixels (However, for inter prediction encoding reference frames may be processed in the form of variable size regions). For instance, FIG. 6 shows a macroblock $B_n$ corresponding to current frame $F_n$.

Encoder 602 may encode each of these blocks in an intra-prediction mode or an inter-prediction mode. Each of these modes employs a prediction block, which is shown as P in FIG. 6. Also, for each of these modes, generation of prediction block P is based on a reconstructed frame that is used as a reference.

In intra-prediction mode, module 622 forms prediction block $P_{intra}$ from samples in the current frame n that have been previously encoded, decoded and reconstructed. These samples are shown in FIG. 6 as $uF'_n$. Intra-prediction may be performed according to various modes. Accordingly, module 618 selects one of these modes for each block within $F_n$. Based on this selection, intra-prediction module 622 generates prediction block $P_{intra}$.

In inter-prediction mode, module 620 forms prediction block $P_{inter}$ by applying motion-compensated prediction techniques from one or more reference frame(s). For example, FIG. 6 shows a reference frame 652, which is the previously encoded and reconstructed frame $F'_{n-1}$. However, two or more encoded and reconstructed frames may be employed as reference frames.

Inter-prediction mode employs motion estimation module 608 and motion compensation module 620. Motion estimation module 608 estimates motion vectors for one or more blocks within current frame $F_n$. These motion vectors are based on corresponding blocks within reference frame $F'_{n-1}$. In embodiments, motion estimation module 106 may be implemented in the manner described above with reference to FIG. 4. However, as described above, frame storage module 204 may alternatively provide the features of storage medium 402.

For each block within frame $F_n$, motion compensation module 620 produces a prediction block $P_{inter}$ based on the corresponding block within the reference frame. This corresponding block is determined from a motion vector estimated by motion estimation module 608.

As shown in FIG. 6, routing module 624 selects either $P_{inter}$ or $P_{intra}$ as prediction block P. This selection may be based on characteristics of frame $F_n$ and one or more other frames. In turn, combining node 610 computes a difference between current macroblock $B_n$ (which is within current frame $F_n$) and prediction macroblock P. This produces a residual or difference macroblock $D_n$. Forward transform module 612 transforms $D_n$ (using, for example a 4×4 block transform) into a set of transform coefficients. In turn, these coefficients are quantized by quantization module 614 into quantized coefficients X. These quantized coefficients are sent to encoding module 616, which may re-order and entropy encode them.

As a result, encoding module 616 outputs a compressed information stream 658 for macroblock $B_n$. In the context of FIG. 1, compressed information stream 658 may be included in encoded signal 124. Compressed information stream 658 may include the encoded coefficients as well as side information for decoding the macroblock. Examples of such side information may include macroblock prediction mode, quantizer step size, motion vector information describing how the macroblock was motion-compensated, etc. Stream 658 may be processed in various ways. For instance, information stream 658 may be transmitted to a remote device, and/or stored in a storage medium.

As described above, reconstruction portion 606 may include motion compensation module 620, intra prediction module 622, routing module 624, inverse quantization module 626, inverse transform module 628, combining node 630, and deblocking filter 632.

Inverse quantization module 626 receives quantized macroblock coefficients X from quantization module 614 and rescales them. These rescaled coefficients are sent to inverse transform module 628, which performs an inverse transform (e.g., an inverse 4×4 block transform) on the coefficients to obtain a difference macroblock $D_n'$. $D_n'$ may not be identical to original difference macroblock $D_n$. This is because of distortion introduced by quantization module 614.

FIG. 6 shows that difference macroblock $D_n'$ is combined (e.g., summed) with prediction macroblock P to produce a reconstructed macroblock $uB'_n$. This reconstructed macroblock is a distorted version of the original macroblock. To reduce this distortion, deblocking filter 632 is applied to the original macroblock. Also, deblocking filter 632 reconstructs macroblocks into a reconstructed frame 654 (also shown as $F'_n$).

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

For example, the techniques described herein are not limited to employing SSAD values and SAD values. For example, other error metric lower bound values and error metrics may be employed. Also, embodiments are not limited to employing 16×16 macroblocks or 4×4 subblocks. Moreover, embodiments may employ various techniques (other than ones based on Markov's inequality) to determine separation thresholds.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
   determining by a calculation module a plurality of error metric lower bound values for a block in a stored current image, wherein each of the error metric lower bound values corresponds to a stored search position in a stored reference image;
   determining a separation threshold using the plurality of error metric lower bound values for the block in the stored current image by applying a binary search to select the separation threshold;
   selecting a plurality of candidate positions from the plurality of search positions based on the determined separation threshold;
   identifying one of the candidate positions as a matching position for the block in the current image; and
   determining by the calculation module a motion vector based on the block in the current image and the matching position.

2. The method of claim 1, wherein each of the error metric lower bound values is a subsampled sum of absolute differences (SSAD) value.

3. The method of claim 1, wherein said identifying comprises
   calculating an error metric for each of the candidate positions; and
   selecting a minimum of the error metrics.

4. The method of claim 3, wherein the plurality of candidate positions includes a zero displacement position.

5. The method of claim 3, wherein each of the error metrics is a sum of absolute differences (SAD) value.

6. The method of claim 1, wherein determining the separation threshold by determining minimum and maximum threshold values.

7. The method of claim 1, further comprising encoding the current image based at least on the motion vector.

8. An apparatus, comprising:
   a storage medium to store pixel data for a current image and a reference image;
   a block selection module to select a block within the current image; and
   a vector calculation module to:
   determine a plurality of error metric lower bound values for the selected block, wherein each of the error metric lower bound values corresponds to a search position in the reference image;
   determine a separation threshold using the plurality of error metric lower bound values for the selected block by applying a binary search to select the separation threshold;
   select a plurality of candidate positions from the plurality of search positions based on the determined separation threshold;
   identify one of the candidate positions as a matching position for the block in the current image; and
   determine a motion vector based on the block in the current image and the matching position.

9. The apparatus of claim 8, wherein each of the error metric lower bound values is a subsampled sum of absolute differences (SSAD) value.

10. The apparatus of claim 8, wherein each of the error metrics is a sum of absolute differences (SAD) value.

11. The apparatus claim 8, wherein the vector calculation module determines the separation threshold by setting a minimum threshold at the lowest error metric lower bound value, setting a maximum threshold at an average of the error metric lower bound values, and selecting the separation threshold using the minimum threshold and the maximum threshold.

12. An apparatus, comprising:
a storage medium to store pixel data for a current image and a reference image;
an encoder to encode the current image, wherein the encoder includes a motion estimation module to generate a motion vector for a block within the image; and
wherein the motion estimation module includes a vector calculation module to:
determine a plurality of error metric lower bound values for the selected block, wherein each of the error metric lower bound values corresponds to a search position in the reference image;
determine a separation threshold using the plurality of error metric lower bound values for the selected block by applying a binary search to select the separation threshold;
select a plurality of candidate positions from the plurality of search positions based on the determined separation threshold;
identify one of the candidate positions as a matching position for the block in the current image; and
determine the motion vector based on the block in the current image and the matching position.

13. The apparatus of claim 12, wherein each of the error metric lower bound values is a subsampled sum of absolute differences (SSAD) value.

14. The apparatus of claim 12, wherein each of the error metrics is a sum of absolute differences (SAD) value.

15. The apparatus claim 12, wherein the vector calculation module further determines the separation threshold so that a number of positions in the plurality of candidate positions is close to a desired value.

16. An article comprising a non-transitory machine-accessible medium having stored thereon instructions that, when executed by a machine, cause the machine to:
determine a plurality of error metric lower bound values for a block in a current image, wherein each of the error metric lower bound values corresponds to a search position in a reference image;
determine a separation threshold using the plurality of error metric lower bound values for the block in the current image by applying a binary search to select the separation threshold;
select a plurality of candidate positions from the plurality of search positions based on the determined separation threshold;
identify one of the candidate positions as a matching position for the block in the current image; and
determine a motion vector based on the block in the current image and the matching position.

17. The article of claim 16, wherein the instructions, when executed by a machine, further cause the machine to determine a lower limit and a upper limit using the plurality of error metric lower bound values for the block in the current image.

18. The article of claim 16, wherein each of the error metric lower bound values is a subsampled sum of absolute differences (SSAD) value.

19. The article of claim 16, wherein each of the error metrics is a sum of absolute differences (SAD) value.

20. The article of claim 16, wherein the plurality of candidate positions includes a zero displacement position.

* * * * *